H. F. Chase,
Potato Masher.
No. 92,703.      Patented July 20, 1869.
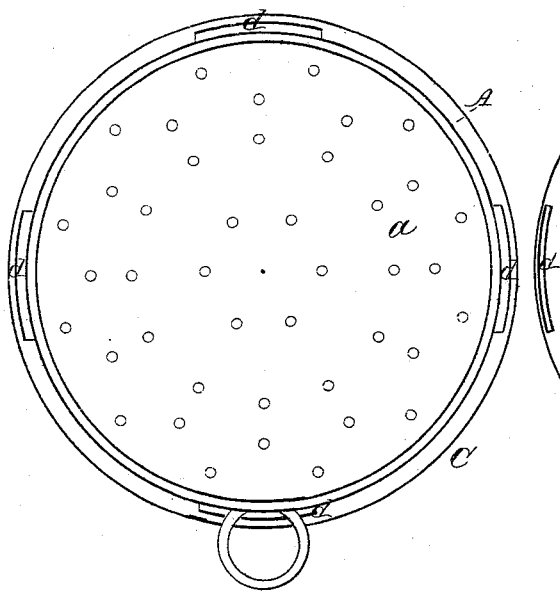
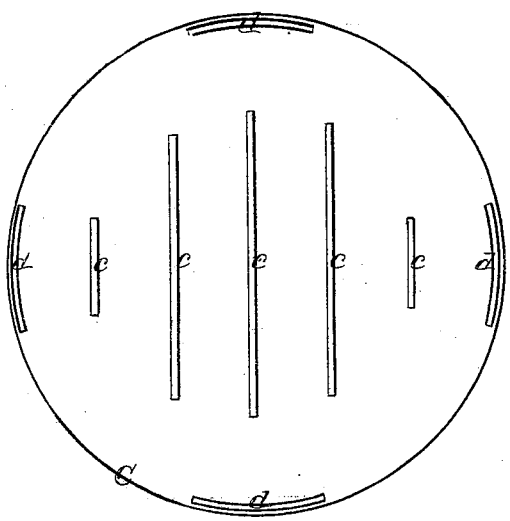
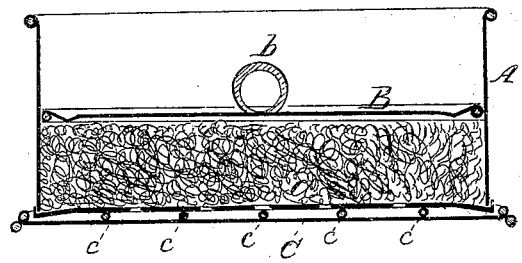
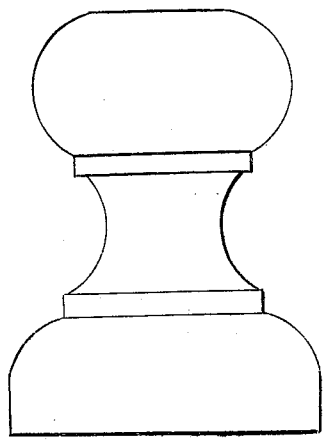
Witnesses
S. N. Piper
J. Renous
Hannah F. Chase.
by her attorney
R. H. Eddy

United States Patent Office.

HANNAH F. CHASE, OF BOSTON, MASSACHUSETTS.

Letters Patent No. 92,703, dated July 20, 1869.

IMPROVED VEGETABLE-MASHER.

The Schedule referred to in these Letters Patent and making part of the same.

*To all persons to whom these presents may come:*

Be it known that I, HANNAH F. CHASE, of Boston, of the county of Suffolk, and State of Massachusetts, have invented a new and useful Apparatus for Mashing Vegetables, and expressing water or liquid matters therefrom; and I do hereby declare the same to be fully described in the following specification, and represented in the accompanying drawings, of which—

Figure 1 is a top view, and

Figure 2, a transverse section of the apparatus, with its parts arranged for use.

Figure 3 is a top view of the foraminous bottom supporter, to be hereinafter described.

In the drawings, A denotes a cylindrical open vessel provided with a foraminous bottom or strainer, $a$, and also with an expresser or plunger, B, the latter being a disk of metal, having a suitable handle, $b$, fixed to it.

To the vessel A, and so as to extend underneath the foraminous bottom or strainer, is what may be termed the supporter of the latter, it being shown at C.

It consists of a disk or plate provided with a series of parallel ridges or ribs, $c\ c\ c$, arranged on, and so as to project above the upper surface of the disk.

There is also a series of curved ridges, $d\ d\ d\ d$, arranged at or near the periphery of the supporting-disk, and so as to project a short distance above the top surface of the disk.

The ridges or flanges $d\ d\ d\ d$ are arranged so as to touch the outer edge or periphery of the bottom of the vessel A, when such vessel may be resting on the series of ribs $c$.

The supporter C may be separate from, or hinged directly to the vessel A, such supporter being intended not only to sustain the bottom of the vessel A, under the pressure to which it may subjected, but to guide away from the vessel the water or juice that may be expressed from any vegetable or other matters contained in the vessel A, when such vessel and the supporter may be arranged within a dish or other vessel, or to be placed on a plane surface.

The peripheral ribs of the supporter serve to sustain the vessel A, under the lateral pressure of a masher, such as shown in side elevation in fig. 4.

To use the apparatus, the expresser should be taken out of the vessel A, preparatory to the introduction into it of the vegetable or vegetables to be mashed. This having been done, such vegetable or vegetables should be placed in the vessel, and mashed by the masher, after which the expresser should be forced down upon the mass, so as to drive from it, and through the bottom $a$, the juices or watery fluids to be expelled from it.

I claim the arrangement of the ribs and the supporting-disk with the vessel A or the foraminous bottom thereof, in manner as specified.

I also claim the bottom supporter, made as described, viz, of the disk and the peripheral and parallel ribs, disposed as specified, such being for use with the vessel A, having a strainer or foraminous bottom, and for use with an expresser and a masher, or either, as set forth.

HANNAH F. CHASE.

Witnesses:
H. G. O. CHASE,
J. R. SNOW.